July 12, 1927.
T. L. E. HAUG
1,635,621
MEANS FOR CUTTING SCREW THREADS IN CHANNELED MATERIAL
Filed July 5, 1922
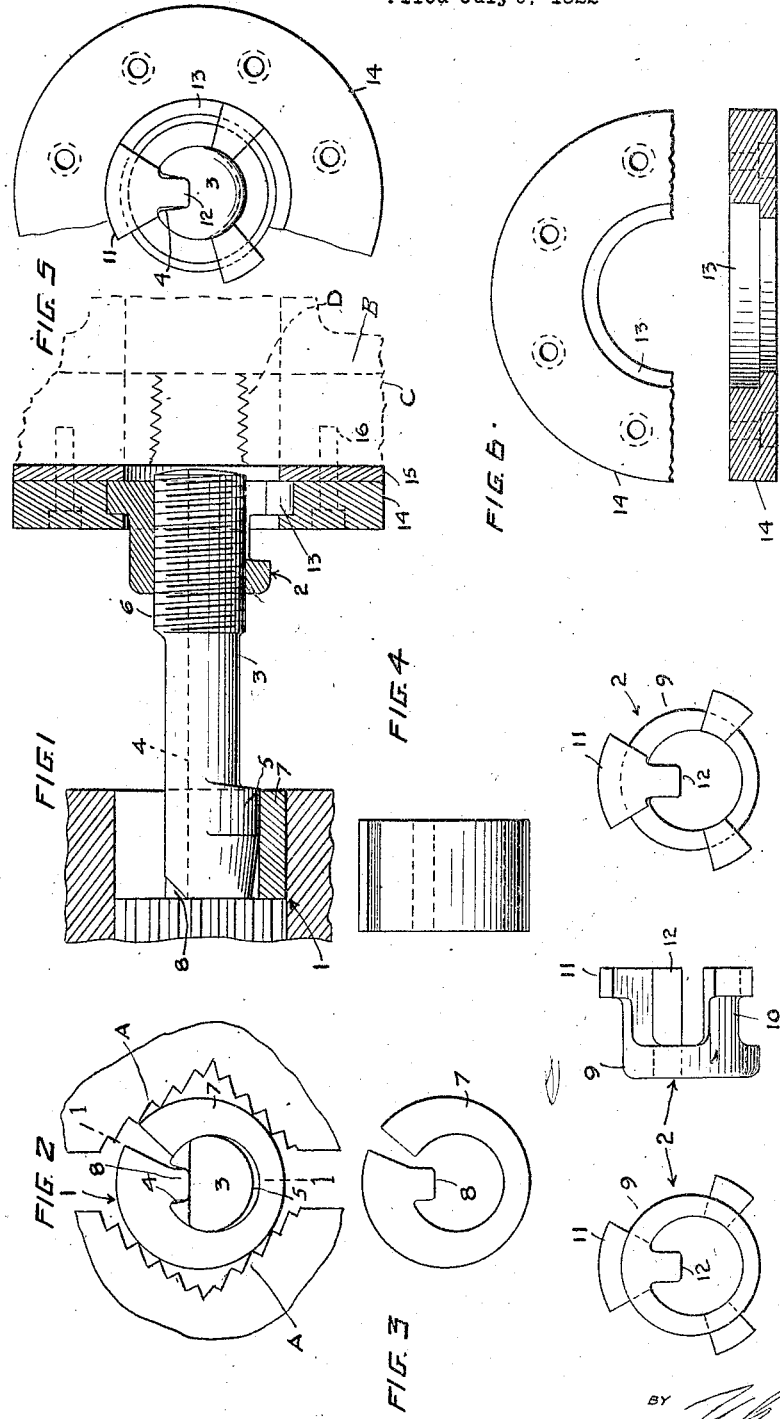
INVENTOR
T. L. E. HAUG
BY 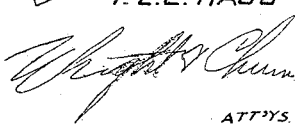
ATT'YS.

Patented July 12, 1927.

1,635,621

UNITED STATES PATENT OFFICE.

THADDEUS L. E. HAUG, OF BERKELEY, CALIFORNIA.

MEANS FOR CUTTING SCREW THREADS IN CHANNELED MATERIAL.

Application filed July 5, 1922. Serial No. 572,761.

The present invention relates to improvements in means for cutting screw threads in material which is not circular in cross section, for example, partly flattened or channeled members such as the channeled bolts exemplified in my U. S. Letters Patent, No. 1,404,955, granted January 31, 1922.

In channeled bolts of the type referred to, the threads are interrupted by channels and when cutting the threads with the ordinary multi-cutter die, there is a tendency for the cutter passing over the channel to be forced into the channel by the pressure of the other cutters on the side of the bolt opposite to the channel. This causes the threads to be cut too deep near the channel and too shallow on the side of the bolt opposite the channel and furthermore endangers the dies since the cutters are apt to foul against the edges of the channel. These difficulties it will be apparent, will be encountered in cutting threads on partly flattened members or in fact in any material not circular in cross section as well as in channeled bolts such as described.

The primary object of the invention is to provide simple, compact and efficacious means for remedying and eliminating objections and difficulties heretofore noted and which will permit of the effective use of an ordinary commercial bolt thread cutter; the means of my invention accomplishing the ends set forth by maintaining the material being threaded and the die properly centered at all times or in other words by maintaining the thread axis of the material being threaded concentric with the axis of rotation of the die.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawing:

Fig. 1 represents a sectional view through the means of my invention shown applied to a bolt, which latter is shown in side elevation, parts of the cutting machine being shown in dotted lines.

Fig. 2 represents an end view of the bolt showing in end elevation one of the centering devices, and also showing the bolt machine vise in which the device is held.

Fig. 3 is a top plan view of the centering device shown in Fig. 4.

Fig. 4 is a side elevation of the device shown in Fig. 3.

Fig. 5 is an end elevation of the structure illustrated in Fig. 1, with certain parts removed and broken away so as to clearly illustrate the construction of the other centering member.

Fig. 6 is a fragmentary plan view of the face plate.

Fig. 7 is a sectional view of said face plate.

Fig. 8 is a front elevation of the centering device shown in Fig. 5.

Fig. 9 is a side elevation of the centering device shown in Fig. 8.

Fig. 10 is a rear elevation of the centering device shown in Figs. 8 and 9.

The practical embodiment of the invention illustrated in the accompanying drawing comprises centering devices or members 1 and 2 which are adapted to engage with end portions of a bolt, or other member to be threaded. In the drawing I have illustrated the means of my invention as particularly adapted to work in conjunction with channeled service bolts of the type described in my U. S. patent hereinbefore referred to. The bolt 3 of this type is provided with a channel or groove 4 and has at one end an offset head 5 and at its other end an enlarged portion 6 adapted to have screw threads cut therein.

The centering device 1 is in the form of a split ring or band 7 having at one extremity an inwardly and radially projected lug or feather 8, which latter is adapted to extend into the channel 4 and snugly engage the bottom of the channel. The inside and outside diameters of the ring are slightly relatively off-set so that when the head 5 is inserted in the ring the outside diameter of the latter will be concentric with the axis of the portion 6 of the bolt. The centering member 1 is adapted to be held between vise jaws A whereby it may be held concentric with the spindle B of the machine.

The centering device 2 is in the form of an annular band or ring 9 provided with spaced exial extensions 10 each of which has a radial projection 11 at its free ends. The radial projections 11 at their outer ends are curved and are concentric with the outer surfaces of the ring 7 and portion 6 of the bolt. The ring 9 and one of the extensions 10 carry an inwardly extending lug or feather 12 which is adapted to engage in the channel 4 as does the feather or lug 8. The inner surface of the extensions 10 are adapted to have a sliding fit with the portion 6 of the bolt. The projections 11 are engaged in an annular recess 13 provided in the outer face of an annular face plate 14 whereby said member 2 is rotatably supported upon the face plate 14. A spacing ring 15 is mounted upon the inner face of the plate 14 and engages the outer face of the projections 11 so as to hold the member 2 upon the plate 14. The plate 14 and ring 15 are secured by fastening means, preferably screws, 16 to the die head C of the threading machine, and the die is arranged in alinement with the openings through the plate and ring so that the bolt may be moved through the piece 2 and plate 14 into contact with the die D.

To operate the means of my invention after the device 1 has been mounted upon the bolt 3 as shown in Fig. 1, it is clamped in the jaws of the vise A on the bolt machine and then moved longitudinally so that it will extend through the device 2 with the feather 12 engaging slidably in the channel 4. The bolt is advanced to the die and when the die commences to cut the threads on the bolt, the radial pressure of the die opposite the channel in the bolt is counteracted by the pressure of the centering device 2 on the bolt, particularly by the feather 12 engaging the bottom of the channel in the bolt. It will thus be seen that the bolt cannot be forced upwardly and cause the channel to foul the cutter that is passing over it at the instant, nor are the threads cut deeper at one point than at another. The two centering devices act therefore, to maintain the thread axis of the material or bolt concentric with the axis of rotation of the thread cutting dies during the thread cutting operation and in this way center the mechanism so as to prevent damaging the cutters or an uneven cutting of the threads. When the means of my invention are used in connection with the ordinary bolt threading machine and dies, it is possible to efficaciously and accurately thread members which are not truly circular in cross section.

I claim:

1. Means for forming screw threads upon axially channeled stock, which means comprises thread forming apparatus and a work holder surrounding the stock, said work holder having an internally projecting lug or finger to engage the channel of said stock and an external surface adapted to engage with the thread forming apparatus, to prevent lateral movement of the stock during the thread forming operation.

2. Means for forming screw threads upon axially channeled stock, which means comprises a die holder rotatable with reference to the stock, and a work holder having an external surface adapted to bear upon the die holder and an internally projecting lug adapted to engage with the channel of the stock, whereby lateral movement of the axis of screw threads during the thread forming operation may be prevented.

THADDEUS L. E. HAUG.